Figure 1:
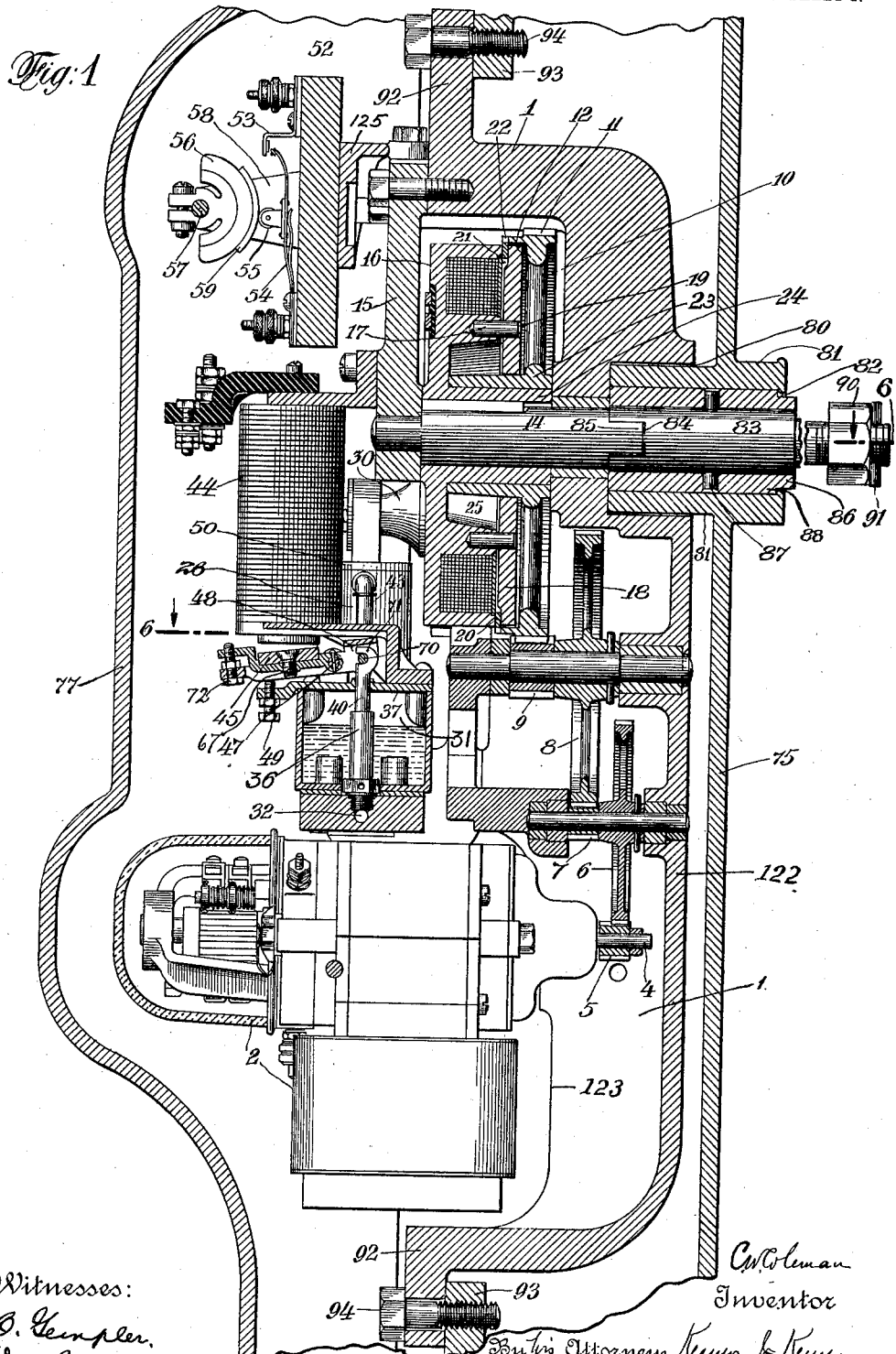

C. W. COLEMAN.
RAILWAY SIGNALING APPARATUS.
APPLICATION FILED FEB. 15, 1909.

1,029,275.

Patented June 11, 1912.

7 SHEETS—SHEET 1.

Witnesses:
J. O. Templer.
Sidney Mann.

C. W. Coleman
Inventor
By his Attorneys Kenyon & Kenyon

C. W. COLEMAN.
RAILWAY SIGNALING APPARATUS.
APPLICATION FILED FEB. 15, 1909.
1,029,275.  Patented June 11, 1912.
7 SHEETS—SHEET 2.
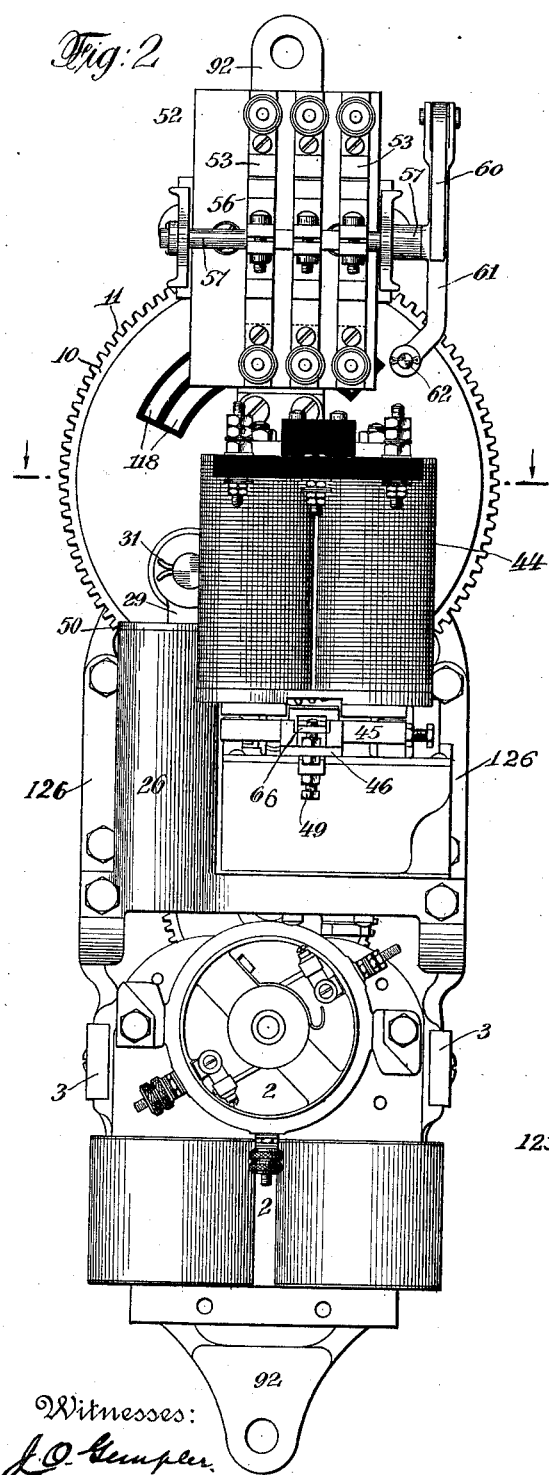
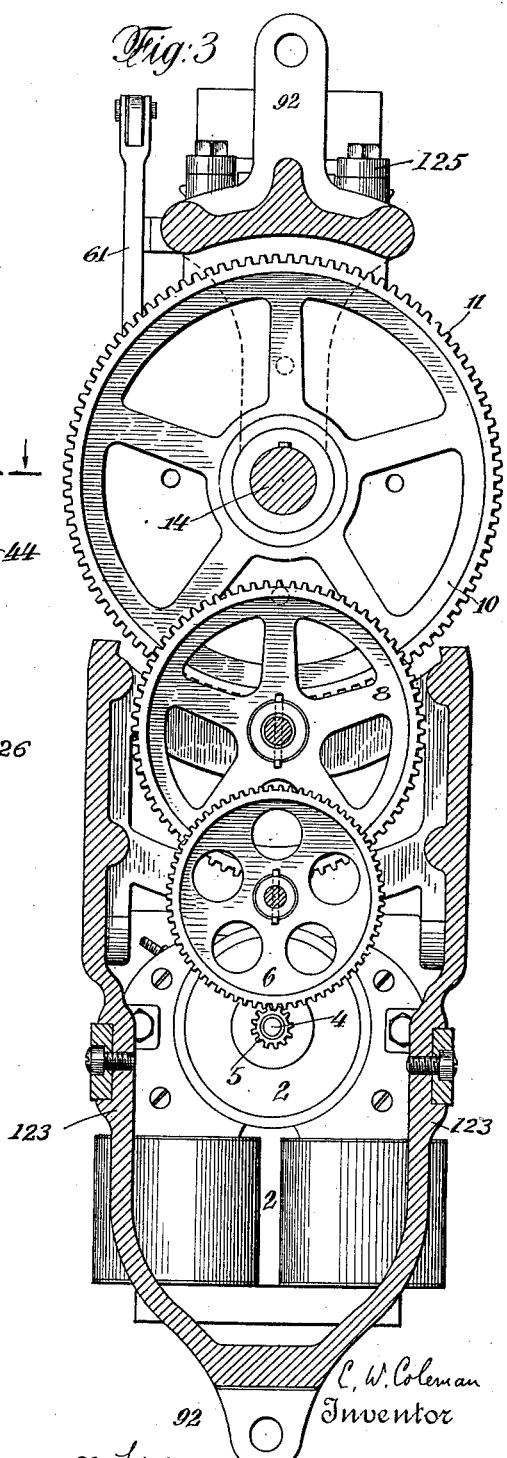

C. W. COLEMAN.
RAILWAY SIGNALING APPARATUS.
APPLICATION FILED FEB. 15, 1909.
1,029,275.
Patented June 11, 1912.
7 SHEETS—SHEET 3.
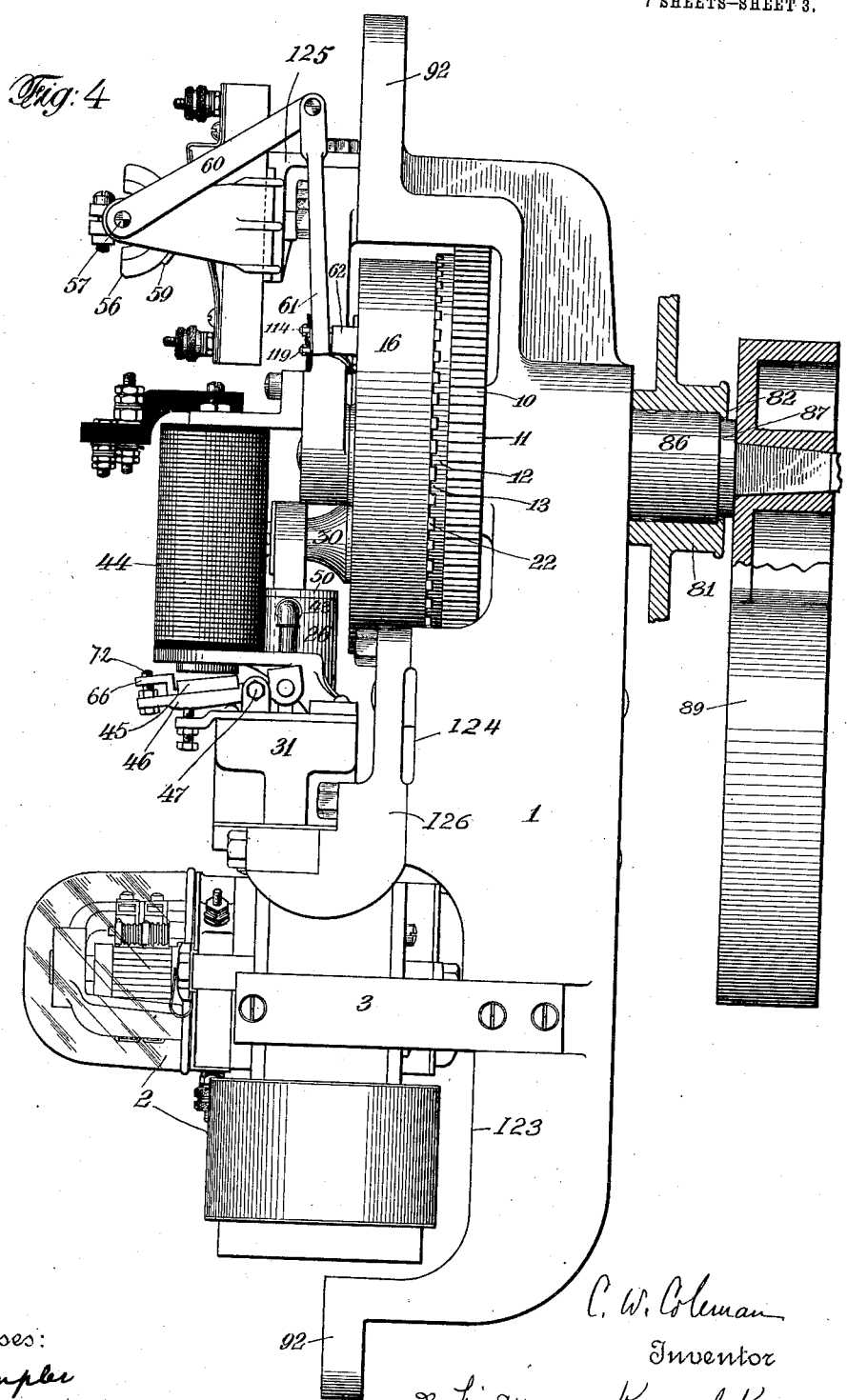

C. W. COLEMAN.
RAILWAY SIGNALING APPARATUS.
APPLICATION FILED FEB. 15, 1909.

1,029,275.

Patented June 11, 1912.

7 SHEETS—SHEET 4.

Witnesses:
J. O. Gempler
Sidney Mann

Inventor
C. W. Coleman
By his Attorney
Kenyon & Kenyon

C. W. COLEMAN.
RAILWAY SIGNALING APPARATUS.
APPLICATION FILED FEB. 15, 1909.

1,029,275.

Patented June 11, 1912.

7 SHEETS—SHEET 5.

C. W. COLEMAN.
RAILWAY SIGNALING APPARATUS.
APPLICATION FILED FEB. 15, 1909.
1,029,275.
Patented June 11, 1912.
7 SHEETS—SHEET 6.
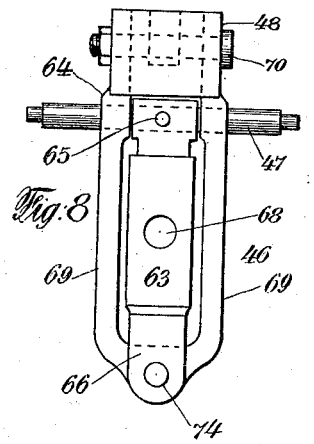
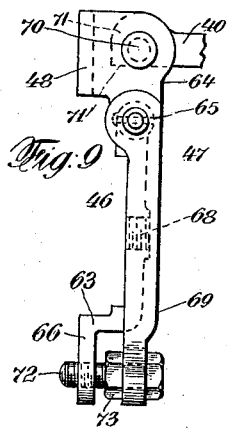
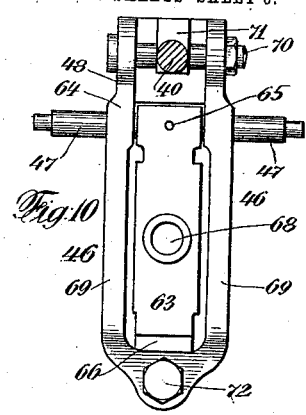
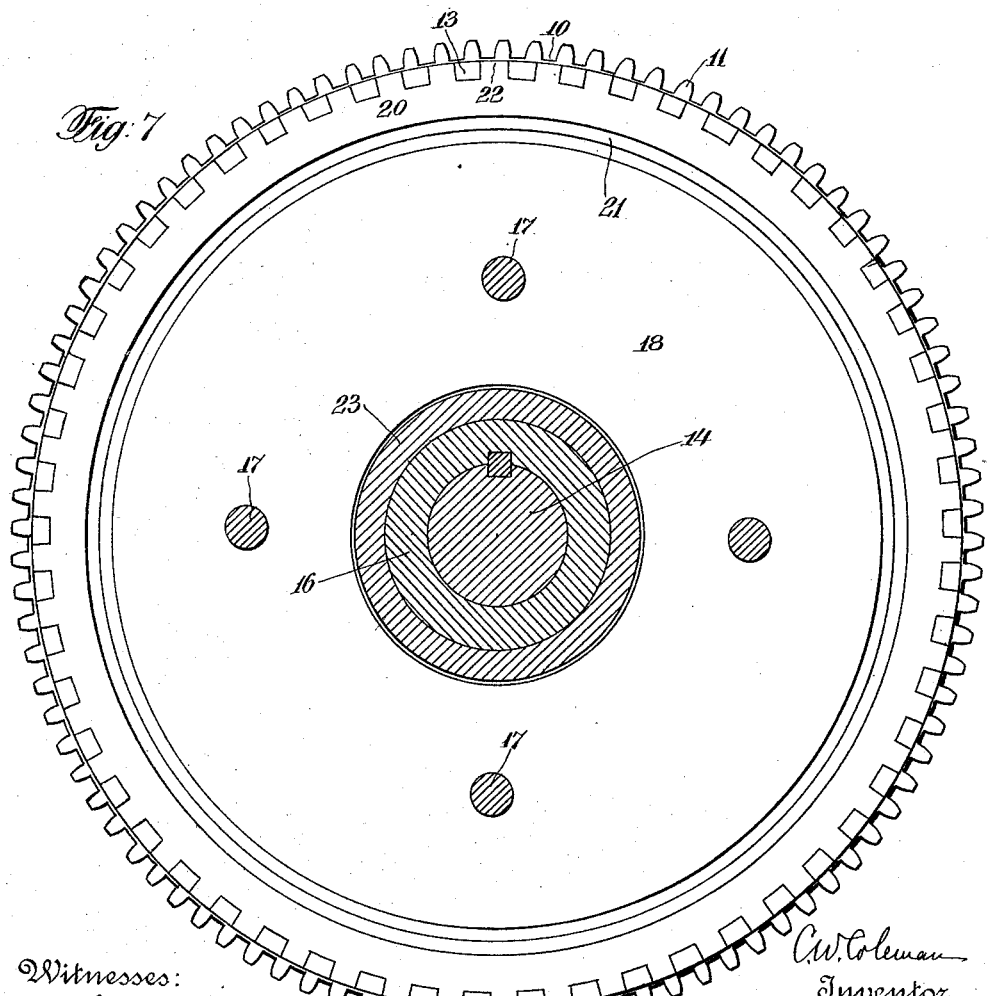

C. W. COLEMAN.
RAILWAY SIGNALING APPARATUS.
APPLICATION FILED FEB. 15, 1909.
1,029,275.
Patented June 11, 1912.
7 SHEETS—SHEET 7.
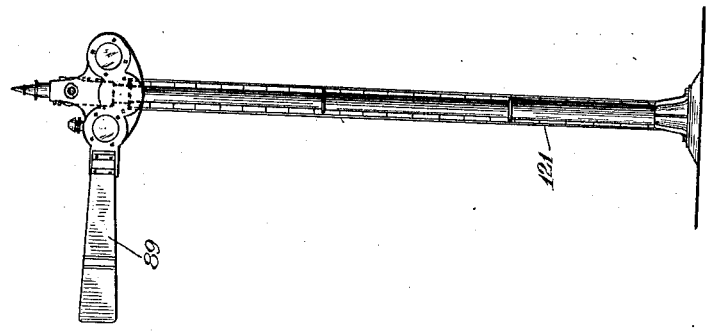
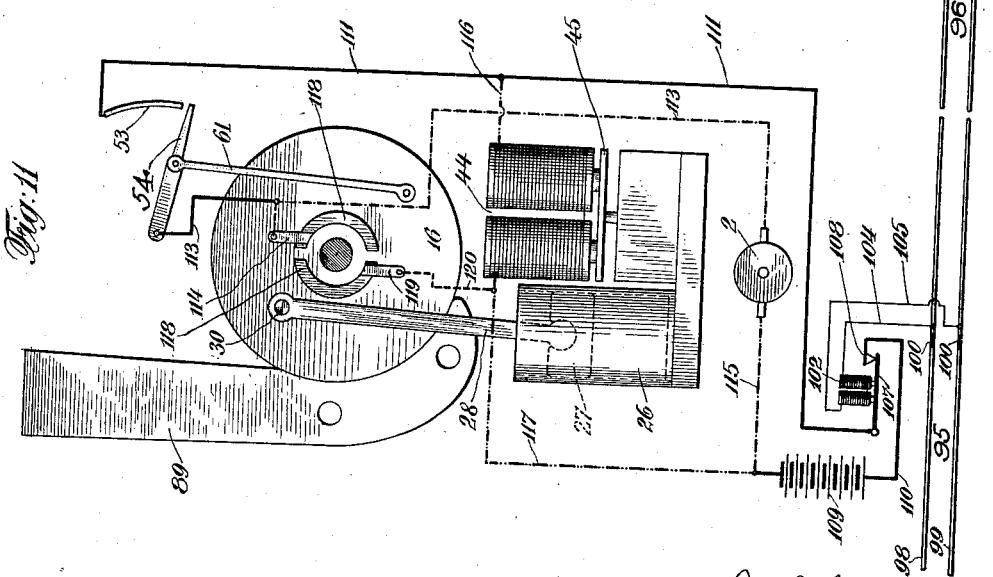

UNITED STATES PATENT OFFICE.

CLARENCE W. COLEMAN, OF WESTFIELD, NEW JERSEY, ASSIGNOR TO THE HALL SIGNAL COMPANY, A CORPORATION OF MAINE.

RAILWAY SIGNALING APPARATUS.

1,029,275.  Specification of Letters Patent.  Patented June 11, 1912.

Application filed February 15, 1909. Serial No. 477,849.

*To all whom it may concern:*

Be it known that I, CLARENCE W. COLEMAN, a citizen of the United States, and a resident of Westfield, Union county, State of New Jersey, have invented certain new and useful Improvements in Railway Signaling Apparatus, of which the following is a specification.

My invention relates to a signal actuating apparatus, being particularly adapted to the operation of semaphores of block signaling systems.

The object of my invention is to provide a simple, compact, economical and efficient mechanism for moving the semaphore to, and holding it at, a definite position or positions and for permitting it to be released from the said position or positions.

I have devised my improvements with special reference to what are known as top post signal mechanisms in which the various actuating and controlling apparatus for the signal are carried on the top of the post carrying the signal and directly connected to the signal shaft.

One feature of my invention involves the actuation of the signal to a definite position, such as its clear position, through a suitable motor and mechanism, and the maintenance of the signal in said position by a body of fluid, preferably a non-congealable liquid, which is drawn into a cylinder by the movement of the signal itself, and maintained in the cylinder until a valve is opened by the operation of the track relays. This avoids the necessity of mechanical locks which are a source of considerable inconvenience in such apparatus and are constantly subject to the need of repair; and it also avoids the unnecessary expenditure of energy in starting the signal since the semaphore is moved as soon as the signal motor is started, whereas in the use of mechanical latches for holding the signal, the coöperative relation between the mechanical latches and the clutch and operating mechanism is such that the signal motor must rotate during a certain period before the signal is moved by the operating mechanism.

Another feature of my invention involves the arrangement of the clutch mechanism between the motor and the signal.

Another feature of my invention involves the manner in which the various parts of the structure are combined to provide a compact, staunch apparatus which may be readily removed as a unit from the signal and its shaft.

Other features of my invention involve novel combinations, construction and arrangement of parts which will be more apparent from the detailed description hereinafter.

My invention consists generally of the apparatus, features, devices and parts, and combinations of the same, as hereinafter described and set forth.

The accompanying drawings illustrate an embodiment of my invention, in which—

Figure 5:
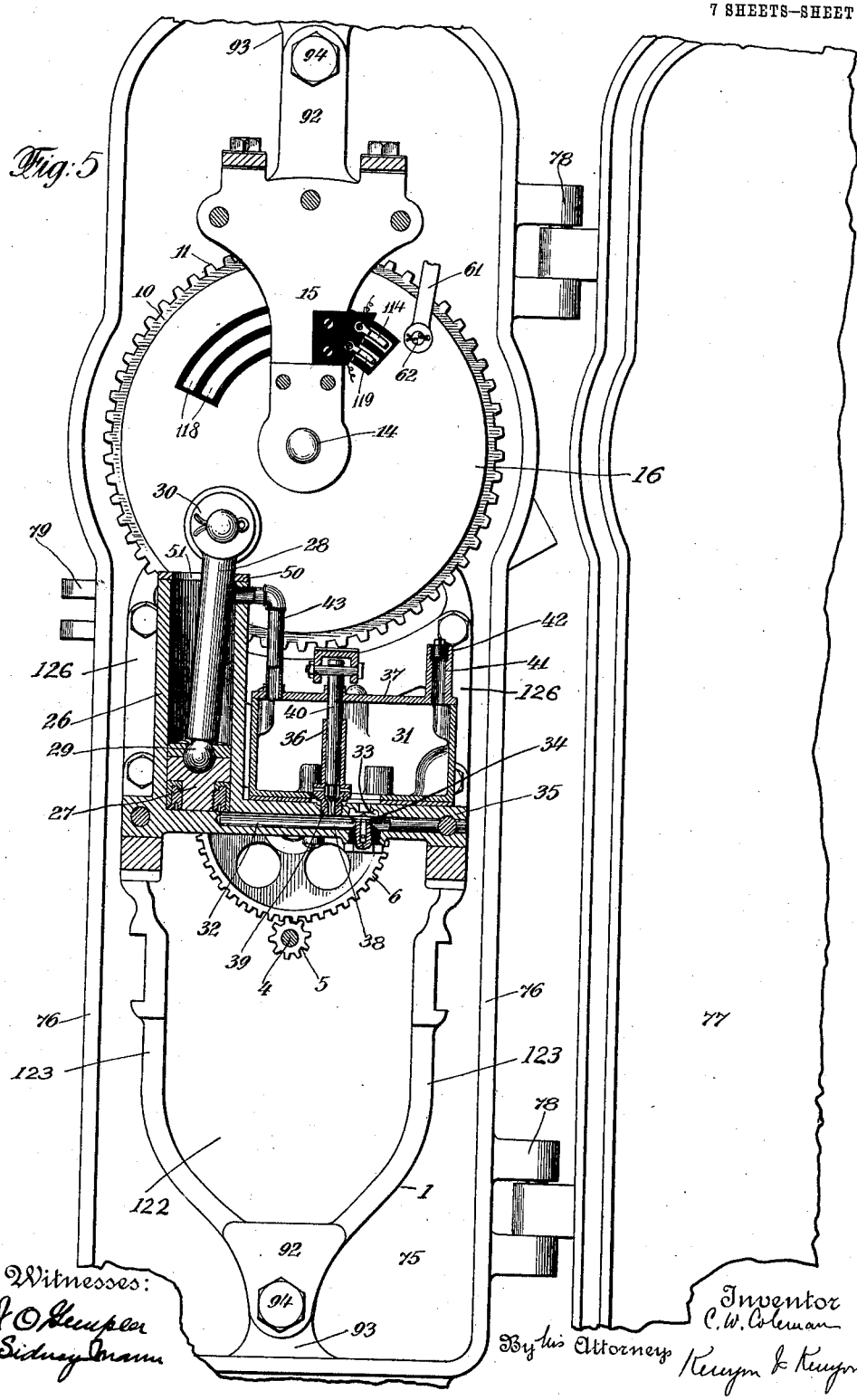
Figure 6:
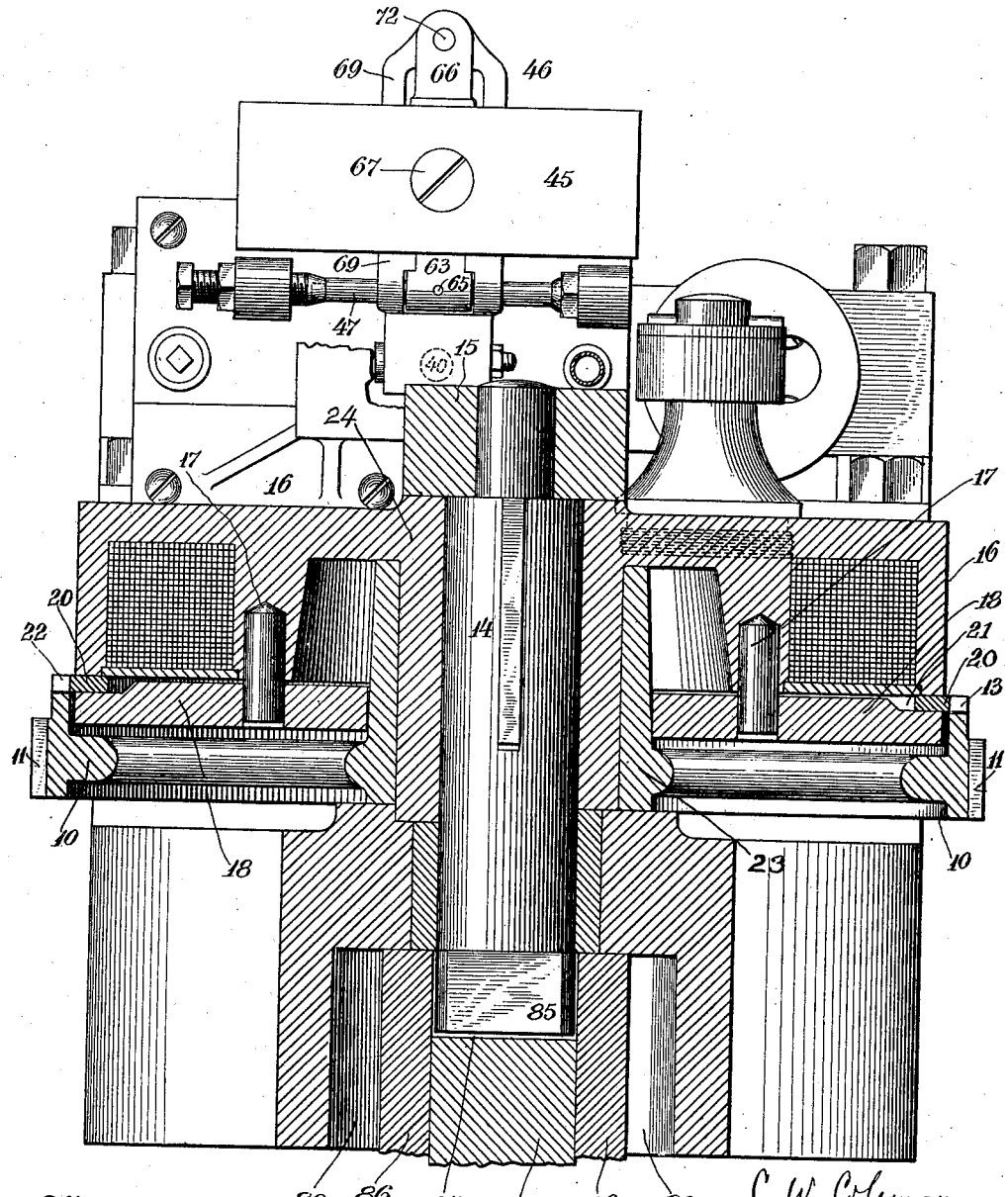

Figure 1 is a central vertical section from front to rear through the apparatus and the casing for the same, with the top and bottom of the casing broken away. Fig. 2 is a front elevation of the apparatus and its supporting frame, the casing being removed. Fig. 3 is a rear elevation of the working parts, the supporting frame being partly in vertical section and partly broken away. Fig. 4 is a side elevation of the apparatus and its supporting frame. Fig. 5 is a front elevation of the supporting frame for the apparatus, the inclosing casing partly broken away and with its door open, parts of the apparatus being removed, and other parts in vertical section to more clearly show the means for maintaining the signal at a definite position. Fig. 6 is a transverse section enlarged through the line 6—6 of Fig. 1. Fig. 7 is an enlarged detail in plan of parts of the magnetic clutch; the bearing shaft, supporting pins, and hubs being in cross-section. Fig. 8 is an enlarged top plan view of a lever for operating a cylinder release valve of the fluid pressure apparatus; Fig. 9 is a side view of the same with an adjusting screw in one end; Fig. 10 is a bottom plan view of the lever as shown in Fig. 9. Fig. 11 is a diagrammatic view illustrating the operation of my invention. Fig. 12 is a side elevation of a signal post with my improvements secured to the top of the same.

Similar characters represent like parts in all the figures.

1 is a main frame of suitable contour for supporting the principal parts of the signal controlling and operating apparatus. I prefer to form this frame with a contour such that the signal controlling and operating mechanism may be compactly arranged thereon, readily accessible for inspection and repairs; the contour of the frame also being such that with the apparatus in position thereon, the frame may be removably secured to and inclosed within a casing of comparatively small depth and breadth, so that the casing will be comparatively inconspicuous when mounted on its signal pole, and will provide comparatively slight resistance to wind pressure.

2 is an electric motor supported on the frame 1 by bracket 3.

4 is the shaft of motor 2, on which is secured a pinion 5. This pinion is connected by a chain of reducing gears, 6, 7, 8 and 9, with a gear wheel 10 for operating a semaphore or other movable signal, the peripheral teeth 11 of said gear 10 engaging with pinion 9. Said gear 10 is provided with a ring 12 extending from the face of said gear, and which ring is provided with crown teeth 13.

14 is a shaft which passes through the gear 10, and the front end of this shaft is journaled in a hanger 15 forming part of the frame 1.

16 is a rotary magnet, preferably circular and keyed to the shaft 14. Said magnet is provided with a plurality of pins 17 extending from the face of the same. 18 is an armature, preferably disk shaped, provided with holes 19 through which the pins 17 loosely pass.

20 is a ring of magnetizable metal, preferably iron, resting in an annular recess 21, between said armature 18 and the magnet 16. Said ring is provided with peripheral teeth 22 extending beyond the armature, and engaging with the crown teeth 13 of the gear 10. The hub 23 of the gear 10 and the hub 24 of the magnet 16 are so arranged that said hubs can revolve freely in relation to each other. In the present instance the hub 24 serves as the journal for the hub 23 of the gear 10 which extends into a recess 25 of the magnet 16.

It will be seen from the above description, that the armature 18 is held up in position adjacent the face of the clutch magnet 16 by the pins 19 on which it has a limited sliding movement toward and away from the clutch magnet when the latter is deënergized, so that normally the annular armature and the clutch magnet which is keyed to the shaft 14, are free to rotate relative to gear wheel 10 and ring 20; but when through suitable circuits, hereinafter mentioned, the magnet 16 and motor 2 are energized, the annular armature is forcibly attracted by the clutch magnet, firmly gripping the ring 20, so that the rotation of motor 2 through the gear 10 meshing with the teeth of ring 20, will drive the magnet clutch and through it will rotate the shaft to move a suitable hereinafter mentioned semaphore.

26 is a vertical cylinder and 27 is a piston therein.

28 is the piston rod having a universal joint connection 29 with the piston 27 and an eccentric connection 30 with the magnet 16.

31 is a tank or reservoir for a fluid, (shown in Fig. 1) preferably oil or other liquid that is non-congealable at ordinary temperatures.

32 is a passage connecting with the cylinder 26 below the piston 27. An opening 33 in the bottom of the tank 31 connects with said passage 32.

34 is an ordinary check valve which permits the free passage of oil to the cylinder through the passage 33, but prevents the oil from returning from the cylinder through this passage. The valve 34 is provided with a vertical guide consisting of a downwardly projecting pin which projects into a vertical hole in the support 35.

36 is a vertical tube extending from the passage 32 up into the tank 31 almost to its top. 38 is a conical valve for engaging with the conical valve seat 39 in said tube 36, the stem 40 of said valve being guided in said tube.

41 is an inlet pipe to the reservoir 31 extending upwardly from its cover 37, through which the fluid may be poured, and which is covered by a screw plug 42.

43 is an overflow pipe extending from the upper portion of the cylinder 26 down through the cover 37 of the reservoir 31.

44 is an electromagnet situated on a plane above the reservoir 31. The armature 45 of said magnet is below the same, and is secured to a lever 46 having its fulcrum at 47. The short arm 48 of the lever 46, is loosely connected to the valve stem 40, so that when the magnet is energized the shorter arm 48 will descend and the valve 38, 39 will close, and when the magnet 44 is deënergized, the long arm of the lever will drop, and thus raise the valve stem 40 and open the valve.

49 is a thumb screw passing through an extension of the top 37 of the reservoir 31, and which screw serves as an adjustable stop for limiting the drop of the long arm of the lever 46, and the armature 45, and the corresponding rise of the valve 38 away from its seat 39.

50 is a plate resting loosely on top of the cylinder 26 so it may slide on the same. Said plate is provided with a hole 51 of larger circumference than the rod 28, and through which said rod loosely passes.

52 is a circuit controller for the circuits of the motor 1 and the clutch magnet 16 and for other circuits not material to my present invention. Said controller is provided with fixed terminals 53 and spring contacts 54.

55 are rollers secured to the springs of contacts 54.

56 are segments secured to a rock shaft 57, journaled in a bracket 58, and which are provided with cams 59.

When the cam engages with and bears down the roller 55, the terminal of the contact 54 is disengaged from the fixed terminal 53 and the circuit is broken. But as soon as the cam passes the roller 55 the spring of the contact 54 will force its terminal into engagement with the spring terminal 53, and thus complete the circuit.

60 is an arm secured to the shaft 57 and loosely connected and pivoted to an arm 61 which is eccentrically pivoted at 62 to the magnet 16.

63 is the part of the lever 46 which supports the armature 45. 64 is the part of said lever which supports the valve stem 40.

65 is a pin which passes through the part 63 and the shaft or fulcrum 47 (Figs. 8, 9 and 10), so as to secure the part 63 to said shaft. The free end of the part 63 is provided with an elbow piece 66. The armature 45 is secured to said part 63 by screw 67 passing through a screw threaded opening 68 in said part. The part 64 is journaled loosely on the shaft 47, and is yoke shaped (see Figs. 8 and 10), and at 69 embraces the main portion of the part 63. The rear or short arm of the part 64 is provided with a cross bolt 70, with which engages the hook 71 on the valve stem 40. The free end of the part 64 and the elbow 66 of the part 63 are adjustably connected by a screw 72, a nut 73 holding said screw within a hole in the part 64, and the screw 72 engaging with the screw thread 74 in said elbow piece. The screw 72 permits the adjustment of the two parts 63 and 64 in relation to each other, and an additional adjustment of the play between the magnet and the valve over that provided by the screw 49.

All of the parts above described are inclosed in a casing as shown in Figs. 1 and 5, 75 being the back of the casing, 76 its sides, 77 its front in the form of a door secured by hinges 78 to one side 76 and a catch 79 to the other side.

In order to provide a firm and strong support for the bearing of the back end of the shaft 14, the following construction is provided: 80 is a circular recess in the back of the frame 1, reinforced by a fixed sleeve or tube 81 extending into the casing and outward from the same. The outer portion of the tube 81 is provided with an inwardly extending flange 82. 83 is practically an extension of the shaft 14, the inner end of which is provided with a mortise 84 into which enters a tenon 85 on the rear end of the shaft 14. 86 is a ferrule which surrounds the extension 83, and which is held to said extension by pins 87 extending peripherally from the same into recesses or holes in the ferrule 86. Said ferrule is provided at its outer end with a cutaway portion forming an annular shoulder 88 which engages with the flange 82 and prevents backward movement of said ferrule and the shaft 83. 89 is a semaphore which is secured to the extension 83 beyond the ferrule 86, and the outer end of said extension is provided with a screw thread with which engages an adjusting nut 90 for keeping the semaphore in place, said nut being locked or prevented from falling off of the extension 83 by a lock pin 91 passing through a hole in said extension.

The apparatus for actuating and holding the signal, as described, permits a staunch, reliable and compact construction with the provision of relatively few and simple operating parts, while, moreover, the various apparatus has been so located, connected and constructed as to still further effect this object.

It will be observed that the main supporting frame 1, as shown, consists of a substantially flat back plate 122 (Figs. 1 and 4) having forwardly projecting legs or offset portions 92—92 for securing the same to a suitable support or casing, and forwardly projecting longitudinal side flanges 123—123 between which and the back plate the motor gearing is accommodated. The flanges 123, as shown, have forwardly projecting or offset portions 124 which, with the projecting legs 92, form what I term recesses or inset portions in one of which is mounted the clutch magnet. The controller 52, as shown, is carried by an auxiliary frame or bracket 125 secured to a plate 15 which is bolted to the upper offset or projecting leg 92, while the signal-supporting fluid pressure apparatus is carried by a second auxiliary frame or bracket 126 secured to the offset or projecting flange portions 124. The flanges 123 give strength to the frame and provide means for securing the auxiliary frames or brackets above mentioned, and also protect the gearing from a certain amount of dust and dirt. Obviously, various changes may be made in the frame while still securing the advantages of its general contour.

The magnet clutch is carried concentrically with the axis of the signal. The holding mechanism is placed in front of the gearing connecting the motor and clutch and above the motor, the magnet 44 being directly in front of the clutch while the oil cylinder and piston are in front of the clutch magnet but extend below the same permitting a direct connection between the piston and the face of the clutch. The reservoir, also placed at the front, is located immediately above the motor. It will be noted that the parts of the apparatus are thus so located that, the holding apparatus and its controlling magnet 44 add nothing to the bulk of the apparatus as a whole and that the parts may be included in a casing which is graceful in appearance and which will be comparatively inconspicuous when mounted upon its pole, and which will provide comparatively little wind resistance, which feature is of considerable importance, since such casings are usually carried at the top of a twenty-foot pole and always in exposed places where they are subjected to high winds.

Referring to Fig. 11;—95, 96 and 97, represent a series of three blocks of a railway track composed of rails 98 and 99 which are separated by the usual insulation 100. 101 represents a track generator for energizing the track relay 102 with which it is connected in series through the rails and conductors 103, 104, 105 and 106. This relay has an armature 107, which, when operated by the energization of the relay, closes a circuit from a generator 109 to the motor 2, magnet 44 and clutch magnet 16, which are all connected in multiple across said generator. When armature 107 is attracted a circuit is completed from generator 109 through conductor 110, armature 107, conductors 111 and 116, through magnet 44 and thence through conductor 117 back to the generator; and a second circuit is closed from conductor 111, contact 53, movable contact 54, through conductor 113, whence the circuit branches, one branch containing brush 114, one of the contacts 118, the coils of magnet 16, second contact 118 brush 119, conductor 120, thence through conductor 117, back to the generator, while the other branch passes along conductor 113, through motor 2 and conductor 115 to the generator.

Referring to Fig. 12 121 is a post or column, on the upper end of which is a casing inclosing the working parts of my invention as hereinbefore described.

The operation of the apparatus is as follows: By referring to Fig. 11, and the description hereinbefore given, it will be seen that when the block 96 is clear the main track circuit previously traced will be energized, thus energizing the magnet 102 and drawing up the armature 107 into contact with terminal 108. This will close the previously traced circuits to the actuating apparatus, energizing motor 2 to rotate the same and energizing the magnet 16 to bring the magnetic clutch into operation, so that the motor 2 will, through the reducing gears and said clutch, rotate the magnet 16 and raise or move the semaphore 89 to "safety", the position shown in Fig. 11. A circuit as above set forth will also be completed through the magnet 44, thus energizing said magnet and closing, and keeping closed, the valve 38, 39 to prevent any fluid from passing through said valve. The rotation of the magnet 16 will, through the rod 28, raise the piston 27 and suck the fluid from tank 31 through the check valve 34 and passage 32 into the cylinder 26 below said piston. The fluid is always prevented from returning back through said check valve into the tank 31. As soon as the magnet 16 is turned so that the semaphore 89 is at "safety", as shown in Fig. 11, the contact 54 will be drawn away from the terminal 53, and thus the circuit will be broken through the motor 2 and the magnet 16, thereby stopping the revolution of the motor and disconnecting the clutch magnet so that said magnet which is positively connected to the piston 27 and semaphore 89 is now free to slip upon the face of the ring 20. The magnet 44, however, will still be energized as it is in the relay circuit, and this circuit is complete. Fluid being prevented from flowing out of the cylinder 26 by reason of the check valve 34 and the valve 39 being closed, said cylinder 26 and its piston 27 will operate as a support, the piston 27 being held up by the fluid under it and retaining the semaphore 89 at its safety position. If a train enters block 96, the circuit from the track generator will be shunted through the wheels and trucks of said train, and thus break the circuit of battery 109 through the relay 102. As soon as said circuit is broken, the magnet 44 will be deënergized, and the valve 38, 39 will open, the valve proper 38 rising from its valve seat. As soon as this happens, the fluid will pass out of the cylinder 26 through the passage 32 and valve opening 39 and tube 36 into the tank 31, piston 27 will descend, and the semaphore 89 will descend to a horizontal position or to "danger" rotating magnet 16 with it, which being deënergized will slip freely on the face of ring 20. The parts will remain as above stated until the train leaves the block 96, when the relay will again be energized and the above operation will be repeated, the semaphore 89 rising to safety, and the contact 54 being brought into electrical connection with the terminal 53 and all the circuits then being completed.

My invention provides a most efficient and simple means for bringing the signal operating mechanism into operative connection with the motor, so that said connection is automatically made at the proper time to change the position of the signal. This result is accomplished by means of my special magnetic clutch devices.

My invention also provides a most efficient and simple means for holding the signal in this position until it is time to return it to its former position, when it will be released automatically and will return to its former position. This result is attained by means of the cylinder and piston in connection with the valves controlling the passages leading to the cylinder.

I desire it to be understood that, while I have disclosed complete details of one specific embodiment of my invention yet that my invention is broader than such details and includes modifications thereof such as will readily occur to those skilled in the art. For example while I have shown a signal having two positions, my invention is equally applicable to signals having a greater number of positions. Again while I have shown and described what is known as an upper quadrant signal operated by a top-post mechanism, yet neither of these features is essential to the practice of my invention, at least in its broader aspects.

What I claim as new and desire to secure by Letters Patent is:—

1. In a railway signaling apparatus, the combination of a movable signal, a motor device, connections between the motor device and the signal through which the latter moves said signal to an indicating position, fluid pressure apparatus including a cylinder and a piston, one of which is connected with the signal and moved when the signal is operated by the motor to draw fluid into the cylinder, and an electro-responsive device controlling said fluid pressure apparatus to support the signal independently of the motor device at any point in its return movement at which said electro-responsive device is energized.

2. In a railway signaling apparatus, the combination of a signal, an electro-magnetically operated clutch one member of which is connected to the signal, a motor connected to the other clutch member for moving the signal to one of a plurality of positions when the clutch is energized, fluid pressure signal holding apparatus having a movable member connected with the first clutch member to be moved thereby when the signal is operated by the motor, an electro-responsive device for controlling the fluid pressure apparatus, and circuits through which said electro-responsive device is controlled for relieving the fluid pressure in said apparatus, to permit said signal to assume a different position.

3. In a railway signaling apparatus, the combination of a signal having a plurality of indicating positions, a motor device, connections between the signal and motor device through which the motor device moves said signal to one of said positions, fluid pressure apparatus including a cylinder and a piston, one of which is connected with the signal and moved when the signal is operated by the motor, to suck fluid into the cylinder, and electro-responsive means operatively related to said fluid pressure apparatus and energized to control said apparatus to support the signal at its operated position independently of the motor device, and deënergized to relieve the fluid pressure therein and permit the return movement of the signal.

4. In a railway signaling apparatus, the combination with a part to be moved, a cylinder and piston one being connected with said part, a fluid passage connected with said cylinder, a check valve in said passage arranged to permit a fluid to enter said cylinder, means independent of the fluid in the cylinder for moving said part in one direction, and means for opening a passage to permit the fluid to pass out from the cylinder when said part moves in the opposite direction.

5. In a railway signaling apparatus, the combination with a movable signal, a motor for operating the same, signal holding mechanism comprising a cylinder and a piston one of which is movable with the signal, a fluid inlet passage connected with one member of said holding mechanism and provided with a check valve, an outlet passage also connected to one member of said holding mechanism, and a valve controlling the same, connections between said motor and signal for moving the signal, connections between the movable member of said holding mechanism and said motor and signal connections for raising said movable member and thereby sucking in the fluid into the cylinder, and means for opening the valve in the outlet passage to permit the fluid to pass out of the cylinder and the piston to drop.

6. In a railway signaling apparatus, the combination with a movable signal, a motor for operating the same, signal holding mechanism comprising a cylinder and a piston one of which is movable with the signal, a fluid inlet passage connected with one member of said holding mechanism and provided with a check valve, an outlet passage also connected to one member of said holding mechanism, and a valve controlling the same, connections between said motor and signal for moving the signal, connections between the movable member of said holding mechanism and said motor and signal connections for raising said movable member and thereby sucking in the fluid into the cylinder through the inlet passage, and means for opening the valve in the outlet passage to permit the fluid to pass out of the cylinder and the piston to drop.

7. In a railway signaling apparatus, the combination with a movable signal, a cylinder, a piston in said cylinder, a fluid passage connected with said cylinder below the piston and provided with a check valve, an outlet passage below the piston, and a valve controlling the same, connections between said piston and signal, a motor, reducing gears connected with said motor, and a clutch between said gears and the signal and piston connections, means for bringing said clutch into and out of engagement so that the motor will move the signal and raise the piston to suck fluid into the cylinder, means for keeping the valve in the outlet passage closed, means for putting said means into operation during the rising of the piston, and for putting it out of operation at certain times to permit said valve to open so as to withdraw the fluid and allow the piston to drop.

8. In a railway signaling apparatus, the combination with a movable signal, a cylinder, a piston in said cylinder, a fluid passage connected with said cylinder below the piston and provided with a check valve, an outlet passage below the piston, and a valve controlling the same, connections between said piston and signal, a motor, reducing gears connected with said motor, and a magnetic clutch between said gears and the signal and piston connections, means for bringing said clutch into and out of engagement so that the motor will move the signal and raise the piston to suck fluid into the cylinder, an electro-magnet for keeping the valve in the outlet passage closed during the rising of the piston, and for permitting said valve to open at certain times whereby the fluid will run out of the cylinder and the piston will drop.

9. In a railway signaling apparatus, a signal having a plurality of indicating positions, a motive power device for moving the signal, a wheel connected with the motive power device, a rotary magnetic clutch for connecting the wheel with and disconnecting it from the signal, a signal-actuating shaft supporting said clutch and wheel, an extension of said shaft journaled in a fixed bearing, and means detachably locking said shaft to said extension.

10. In a railway signaling apparatus, a signal to be moved, fluid pressure apparatus including a cylinder and a piston, one being connected with the signal, actuating apparatus for said signal acting independently of the cylinder and the piston to move said signal in one direction and draw liquid into the cylinder, means including a check valve for supporting said signal in its operated position, and an electro-responsive device for controlling the fluid pressure in said cylinder.

11. In a railway signaling apparatus, a signal to be moved, a cylinder and piston, one being connected with said signal, actuating apparatus for said signal acting independently of the cylinder and piston to move said signal in one direction and draw fluid into the cylinder, a passageway connecting with the cylinder, a check valve in said passageway for preventing the movement of the said signal in the opposite direction but permitting it to be moved by said actuating apparatus to draw fluid into said cylinder, and an electromagnetically controlled valve discharging the fluid from said cylinder to permit the return movement of the signal.

12. In a railway signaling apparatus, a signal, a rotatable shaft for the signal, means for rotating the shaft in one direction to move the signal, a piston and a cylinder, one being operatively connected with said shaft, means permitting the movement of said shaft by said first means to move the signal and draw fluid into the cylinder but preventing its movement in the opposite direction, and electro-magnetically controlled means for relieving the fluid pressure in said cylinder to permit the return of the signal.

13. In a railway signaling apparatus, a signal, a cylinder and piston, one being connected to move with the signal, actuating apparatus for said signal acting without the aid of said cylinder and piston to move the signal in one direction, a reservoir, a check valve for permitting the movement of said signal by said actuating apparatus to draw liquid from the reservoir into the cylinder, but preventing the movement of said signal in the opposite direction, and an electromagnetically controlled valve for discharging the liquid from the cylinder into the reservoir to permit the return of the signal.

14. In a railway signaling apparatus a movable signal, a cylinder and piston, one being connected with said signal, a motor, connections between said signal and motor through which the latter moves said signal in one direction to an indicating position thereby drawing fluid into the cylinder, and an electro-responsive device operatively related to the cylinder and controlling the fluid pressure therein to support said signal at said indicating position after the motor has been deënergized.

15. In a railway signaling apparatus, a signal to be moved, a rotatable shaft for said signal, means for rotating the shaft to move the signal, signal-holding mechanism comprising a cylinder and a piston, and a connection including a pivotal joint between said shaft and one of said last named elements for moving the latter when the shaft is rotated by said means to move the signal.

16. In a railway signaling apparatus, a movable signal, a motor device moving said signal to an indicating position, signal-supporting fluid pressure apparatus supporting the signal at its operated position without the aid of the motor device and including a cylinder and a piston, one being connected with said signal and moved when the signal is operated by the motor to draw fluid into the cylinder to support said signal, and an electro-responsive device operatively related to said fluid pressure apparatus and controlling the fluid pressure therein.

17. In a railway signaling apparatus, a signal to be moved, a cylinder and piston, one being connected with said signal, a motor device, connections between said signal and motor device through which the latter moves said signal in one direction thereby drawing fluid into the cylinder, a passageway connecting with said cylinder, electromagnetically controlled means when energized acting without the aid of the motor device to close the passageway to prevent the flow of fluid from the cylinder, thereby preventing the return movement of said signal, and when deënergized discharging fluid from said cylinder to permit the return movement of said signal.

18. In a railway signaling apparatus, the combination of a signal having a plurality of indicating positions, a motive power device for moving the signal to one of said positions, a clutch for connecting the signal to the motor, signal-supporting fluid pressure apparatus including a cylinder and a piston one of which is connected with the signal to be moved when the signal is operated by the motor to draw fluid into the cylinder to support said signal, and an electromagnetically controlled device operatively related to said cylinder for controlling the fluid pressure therein.

19. In a railway signaling apparatus, the combination of a signal having a plurality of indicating positions, a motive power device for moving the signal to one of said positions, a clutch for connecting the signal to the motor, signal-supporting fluid pressure apparatus supporting said signal at its operated position after the clutch has been released, and including a cylinder and a piston one of which is connected with the signal to be moved when the signal is operated by the motor to draw fluid into the cylinder, and an electromagnetically controlled device controlling said fluid pressure apparatus.

In testimony whereof, I have signed my name to this specification, in the presence of two subscribing witnesses.

CLARENCE W. COLEMAN.

Witnesses:
    EDWIN SEGER,
    ANNA DALY.

---

Copies of this patent may be obtained for five cents each, by addressing the "Commissioner of Patents, Washington, D. C."